April 10, 1928.

L. DREYFUS 1,665,691

TWO-VOLTAGE DIRECT CURRENT GENERATOR

Filed Feb. 23, 1927

Inventor
Ludwig Dreyfus
by C Wallau White
Attorney

Patented Apr. 10, 1928.

1,665,691

UNITED STATES PATENT OFFICE.

LUDWIG DREYFUS, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN.

TWO-VOLTAGE DIRECT-CURRENT GENERATOR.

Application filed February 23, 1927, Serial No. 170,313, and in Sweden December 4, 1924.

An electric generator intended to operate in parallel with a storage battery should, if a booster or a reconnection shall not be necessary, be able to deliver two different voltages simultaneously, corresponding to the charging and discharging voltages of the battery. Various devices have been proposed for this purpose. According to the present invention the generator is provided with at least two brush sets embracing zones of different width on the commutator. The distribution of the pole arcs along the periphery of the armature is preferably such that the said periphery is divided in zones having a low reluctance for the generation of the voltage and zones having a high reluctance for the commutation.

Figure 1:
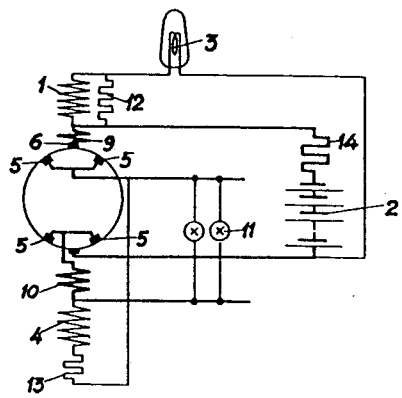
Figure 2:
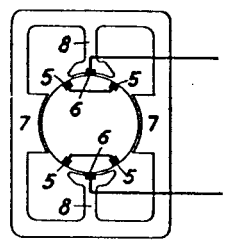
Figure 3:

A form of the invention is illustrated in the accompanying drawing. Fig. 1 of the drawing shows the diagram of connections for the general arrangement. Fig. 2 shows the magnetic parts of the generator. Fig. 3 is a flux diagram.

The machine illustrated is of a type intended to deliver a practically constant voltage over a large range of speed and has for this purpose a set of short-circuited brushes, the armature current between which creates the main field. The voltage between the said brushes is produced by an auxiliary field which can be varied according to circumstances. It may for instance be generated by two windings counteracting each other, one of which, designated as 1, is fed by substantially constant current from the battery 2 through an iron wire resistance 3 and the other 4 in a manner to be specified. The brushes 5 closing the circuit which serves to generate the main field are four in number (in a two-pole machine) and are short-circuited in pairs in the direction of said main field, but serve also to deliver the line voltage of the generator—between the short-circuited pairs. For this purpose, they must stand between the neutral zones. In these zones, on the other hand, there are other brushes 6 which deliver the charging current for the battery. The charging voltage will thus be greater than the line voltage in a proportion determined by the distance between the brushes and the distribution of the flux around the periphery of the armature.

Fig. 2 shows a suitable arrangement of the magnet core in a two-pole machine. Unlike the usual arrangement in such machines where the main field is produced by brushes short-circuiting an armature winding, the said main field has its own salient poles 7. The auxiliary field has such poles 8, as usual. Fig. 3 shows the aspect of a half-wave of the flux, counted from center to center of the auxiliary poles. The magnetomotive force generated by the short-circuited armature conductors varies substantially as shown by the dotted curve, while the flux, by reason of the variable reluctance, will be represented by the full curve.

The voltage between the brushes 6 will thus correspond to the entire hatched surface, and the voltage between brushes 5 the middle rectangular surface. By suitably dimensioning the pole arcs, it is obviously possible to obtain any desired proportion between these two voltages and simultaneously the proportion between the armature ampere turns generating the main flux and the resultant ampere turns on the auxiliary poles 8. By placing the brushes 5 in the gap between the different pole arcs, a good commutation is obtained under these brushes. For improving the commutation under the brushes 6, which however carry less current, recesses may be made in the auxiliary poles corresponding to the commutation zones.

The counteracting winding 4 on the auxiliary poles 8 is preferably connected between the pairs of brushes 5, whereby the machine will endeavour to keep a constant voltage between these brushes. One series winding 9 traversed by the battery current and one 10 traversed by the load current proper (through the lamps 11) should be placed on the same poles for totally or partially compensating the armature reaction. For compensating the action of the resistance variations caused by temperature changes, resistances 12, 13 having low, or negative, temperature coefficient are preferably connected in parallel to the winding 1 and in series with the winding 4, respectively. As the resistance in the winding 1 increases by temperature rise, the current therein is reduced, since the resistance 3 acts to keep the current constant and the resistance 12 is comparatively constant. By suitably dimensioning the resistances 12 and 13 the said reduction of current in the winding 1 may be made proportional to the unavoidable reduction of current in the winding 4, whereby the voltage on the lamps may be kept approximately constant. In certain cases it may be recommended to make this temperature compensation only partial.

Finally, the charging current through the battery may be limited, in a manner known per se, by a resistance 14, whereby said current is more readily adapted to the state of charge of said battery.

I claim as my invention:—

1. In direct current generators, an armature having a commutator, a field having a system of main poles, a set of brushes bearing on said commutator in the neutral zones of said main poles, brushes short-circuited over a portion of said armature in the direction of the magnetic path of said main poles, and means for tapping a current between said short-circuited brushes and said other brushes.

2. In direct current generators, an armature having a commutator, a field having a system of main poles and auxiliary poles therebetween, a set of brushes bearing on said commutator in the neutral zones of said main poles, brushes short-circuited over a portion of said armature in the direction of the magnetic path of said main poles, and means for tapping a current between said short-circuited brushes and said other brushes.

3. In direct current generators, an armature having a commutator, a field core having main poles and auxiliary poles therebetween, brushes short-circuiting portions of the armature in the direction of the magnetic path of said main poles, and shunt windings on said auxiliary poles.

4. In direct current generators, an armature having a commutator, a field core having main poles and auxiliary poles therebetween, brushes short-circuiting portions of the armature in the direction of the magnetic path of said main poles, and windings counteracting each other on said auxiliary poles.

5. In direct current generators, an armature having a commutator, a field core having main poles and auxiliary poles therebetween, brushes short-circuiting portions of said armature in the direction of the magnetic path of said main poles, a winding carrying substantially constant current on said auxiliary poles, and a winding counteracting the aforesaid and connected to said short-circuited brushes.

6. In direct current generators, an armature having a commutator, a field core having main poles and auxiliary poles therebetween, brushes short-circuiting portions of said armature in the direction of the magnetic path of said main poles, windings counteracting each other on said auxiliary poles, and resistances having low or negative temperature coefficient connected in series or parallel to said windings.

In testimony whereof I have signed my name to this specification.

LUDWIG DREYFUS.